US012762450B2

(12) United States Patent
Samkharadze et al.

(10) Patent No.: US 12,762,450 B2
(45) Date of Patent: Oct. 13, 2026

(54) COMPENSATED MICROWAVE DRIVEN QUBITS

(71) Applicants: Nederlandse Organisatie voor toegepast-natuurwetenschappelijk onderzoek TNO, 's-Gravenhage (NL); Technische Universiteit Delft, Delft (NL)

(72) Inventors: Nodar Samkharadze, Delft (NL); Xiao Xue, Delft (NL)

(73) Assignees: Nederlandse Organisatie voor toegepast-natuurwetenschappelijk onderzoek TNO, 's-Gravenhage (NL); Technische Universiteit Delft, Delft (NL)

( * ) Notice: Subject to any disclaimer, the term of this patent is extended or adjusted under 35 U.S.C. 154(b) by 616 days.

(21) Appl. No.: 18/275,173

(22) PCT Filed: Feb. 11, 2022

(86) PCT No.: PCT/NL2022/050071
§ 371 (c)(1),
(2) Date: Jul. 31, 2023

(87) PCT Pub. No.: WO2022/173301
PCT Pub. Date: Aug. 18, 2022

(65) Prior Publication Data

US 2024/0095567 A1 Mar. 21, 2024

(30) Foreign Application Priority Data

Feb. 12, 2021 (EP) .................................... 21156758

(51) Int. Cl.
*G06F 7/00* (2006.01)
*G06N 10/40* (2022.01)

(52) U.S. Cl.
CPC .................................... *G06N 10/40* (2022.01)

(58) Field of Classification Search
CPC ...................................................... G06N 10/40
(Continued)

(56) References Cited

U.S. PATENT DOCUMENTS 10,483,980 B2 * 11/2019 Sete ........................ G06N 10/40
2014/0266406 A1 9/2014 Abraham et al.
2020/0125987 A1 4/2020 Bishop et al.

OTHER PUBLICATIONS

European Patent Office, International Search Report in corresponding International Application No. PCT/NL2022/050071, dated May 27, 2022 (3 pages).

(Continued)

*Primary Examiner* — Isaac M Woo
(74) *Attorney, Agent, or Firm* — Leydig, Voit & Mayer, Ltd.

(57) ABSTRACT

A method and system are described for driving a set of qubits. A first qubit is provided with a first driving frequency and a second qubit is provided with a second driving frequency. Each qubit is provided with a separate microwave gate configured to apply a respective microwave signal. A first electrical signal including the first driving frequency is applied to the first microwave gate for driving the first qubit. Simultaneously a second electrical signal is applied to the second microwave gate including the first driving frequency shifted in phase with respect to the first electrical signal for generating the second microwave signal with the first driving frequency arriving at the second qubit in counterphase to first microwave signal. This may at least partially compensate crosstalk.

20 Claims, 5 Drawing Sheets

(58) Field of Classification Search
USPC .................................... 707/600–899; 706/62
See application file for complete search history.

(56) References Cited

OTHER PUBLICATIONS

Matthias Steffen et al., "Simultaneous Soft Pulses Applied at Nearby Frequencies," Journal of Magnetic Resonance 146, pp. 369-374 (2000).

T.F. Watson et al., "A programmable two-qubit quantum processor in silicon," arxiv.org, Cornell University Library, Aug. 14, 2017, XP081407718 (22 pages).

* cited by examiner

COMPENSATED MICROWAVE DRIVEN QUBITS

CROSS-REFERENCE TO RELATED APPLICATIONS

This patent application is a U.S. National Phase of PCT International Application No. PCT/NL2022/050071, filed Feb. 11, 2022, which claims priority to European Application No. 21156758.1, filed Feb. 12, 2021, which are both expressly incorporated by reference in their entireties, including any references contained therein.

TECHNICAL FIELD AND BACKGROUND

The present disclosure relates to methods and systems for driving a set of qubits (quantum bits), e.g. as part of a quantum processor or other quantum device.

As background, US 2020/0125987 A1 explains that in quantum hardware, a mechanism to implement gate operations and measurements on the hardware is to generate microwave pulses and send the microwave pulses into the quantum computing system. The microwave pulses can cause the state of the quantum computing system to update in a defined way. In an ideal case, the effect of the pulses on one qubit is independent of what is occur ring on the other qubits. However, in operation, pulses sent down a line (e.g., through a port, also referred to as microwave gate) that are intended for one qubit can hit an unintended qubit. The pulse(s) received at the unintended qubit(s) is referred to as "crosstalk" or "control crosstalk". When the unintended qubits have similar frequencies (as they do in a cross-resonance coupling design) the control crosstalk can cause a frequency shift of the qubit based on a physical process known as the AC-stark shift.

To reduce crosstalk, the prior art system of US 2020/0125987 A1 describes a control sequence that comprises a pulsing operation for a first qubit and at least a second qubit of a quantum circuit; and a coordination component that performs a calibration operation associated with a first pulse of a first channel of the first qubit of the pulsing operation and at least a second pulse of at least a second channel of the second qubit of the pulsing operation to selectively reduce a crosstalk in the quantum circuit. To generate respective pulses for respective qubits, the system comprises an electrical waveform generator that generates a single channel waveform; one or more configurable amplitude scalers that scale the single pulse to facilitate calibration of the qubits; and one or more configurable phase-shifters that implement frame changes at the qubits.

As further background, Watson et al. [Nature 555, 633-637 (2018)] describe a programmable two-qubit quantum processor in silicon. In this prior art, the coherent individual control of both qubits is achieved by patterning three cobalt micromagnets on top of the device. These micromagnets provide a magnetic-field gradient with a component that is perpendicular to the external magnetic field for electric dipole spin resonance (EDSR). Furthermore, the field gradient across the two dots results in qubit frequencies that are well separated ($f_{Q1}$=18.4 GHz, $f_{Q2}$=19.7 GHz), which allows the qubits to be addressed independently.

There remains a need for further improving the ability to individually manipulate physically adjacent qubits.

SUMMARY

The small size and tight pitch of qubits, hosted in semiconductor quantum dots qubit devices, makes them one of the leading candidates for large-scale quantum computers. However, this tight pitch of qubits can also make them more susceptible to microwave crosstalk. In current multiqubit quantum dot devices, the qubit microwave drive is typically implemented using a shared electrode driving multiple qubits, where frequencies of many qubits are multiplexed. This causes unwanted crosstalk between the qubits, and limits the fidelity of quantum gates. Aspects of the present disclosure are directed to an architecture of gate-defined quantum dot based qubits, where microwave driving field for each qubit is created by a combination of a multiple driving gates. In this architecture, each of the qubits has one main dedicated microwave gate, and its unwanted effects on the neighboring qubits is cancelled out by applying appropriate microwave excitations to the neighboring gates. This can result in a more localized microwave electric field at the position of each of the qubits with their designated frequencies. The amplitudes and the phases can be calibrated, enabling high-fidelity quantum operations of a large-scale dense qubit array in silicon.

Aspects as described herein can be embodied as methods and systems for driving a set of qubits. In a quantum processing device, as described herein, a first qubit has a first driving frequency and a first microwave gate configured to apply a first microwave signal to the first qubit. A second qubit is arranged adjacent the first qubit and has a second driving frequency, which is substantially different from the first driving frequency. This in principle allows the qubits to be addressed independently using different frequencies. Furthermore a second microwave gate, separate from the first microwave gate, is configured to apply a second microwave signal to the second qubit. This allows to locally apply the respective microwaves to the respective qubit, which may further improve the qubits to be addressed independently. Electrical signals can be applied to the microwave gates, e.g. using a (voltage or current) signal generator. A first electrical signal comprising the first driving frequency is applied to the first microwave gate for applying the first microwave signal at the first driving frequency to the first qubit thereby driving the first qubit. Simultaneously a second electrical signal is applied to the second microwave gate. The second electrical signal comprises the first driving frequency shifted in phase and/or lowered in amplitude with respect to the first electrical signal such that the second microwave signal is generated with the first driving frequency to arrive in counterphase with the amplitude of the first microwave signal arriving the second qubit. In this way crosstalk of the first microwave signal to the second qubit can be at least partially compensated, preferably cancelled as much as possible. By the synergetic combination of using qubits with substantially different driving frequencies, locally applying the microwaves to respective qubits using separate gates, and compensating crosstalk by also applying the driving frequency of a respective qubit on a neighboring gate, e.g. in counterphase, the ability to individually manipulate physically adjacent qubits is greatly improved.

Aspects of the present disclosure are described e.g. with reference to gate-defined electron spin qubits, but the teachings can be applied also to other tightly-pitched qubits with electrical drive. For example, the teachings can be applied to make a dense array of quantum dot qubits, where at least the neighboring qubits have different frequencies, and each of the qubits has a dedicated microwave gate. Gate 1 to control qubit 1, gate 2 for qubit 2 and so on. When applying the microwave drive to gate 2 in order to drive qubit 2, there will be crosstalk where qubit 1 will also be influenced by the drive on gate 2, and experience off-resonant driving. In order to correct for this, a microwave tone can be applied also to gate 1 with the frequency of qubit 2, with a particular amplitude and phase, such that the electrical excitation at the frequency of qubit 2 is cancelled out at the position of qubit 1. Similarly, the microwave excitation at the frequency of qubit 1 is cancelled out at the position of qubit 2. In this way, each of the gates carries microwave excitation at the frequencies of multiple qubits, designed to deliver drive at the frequency of its designated qubit, while cancelling out the excitation at the frequencies of other qubits.

BRIEF DESCRIPTION OF DRAWINGS

These and other features, aspects, and advantages of the apparatus, systems and methods of the present disclosure will become better understood from the following description, appended claims, and accompanying drawing wherein:

DESCRIPTION OF EMBODIMENTS

Figure 1A:
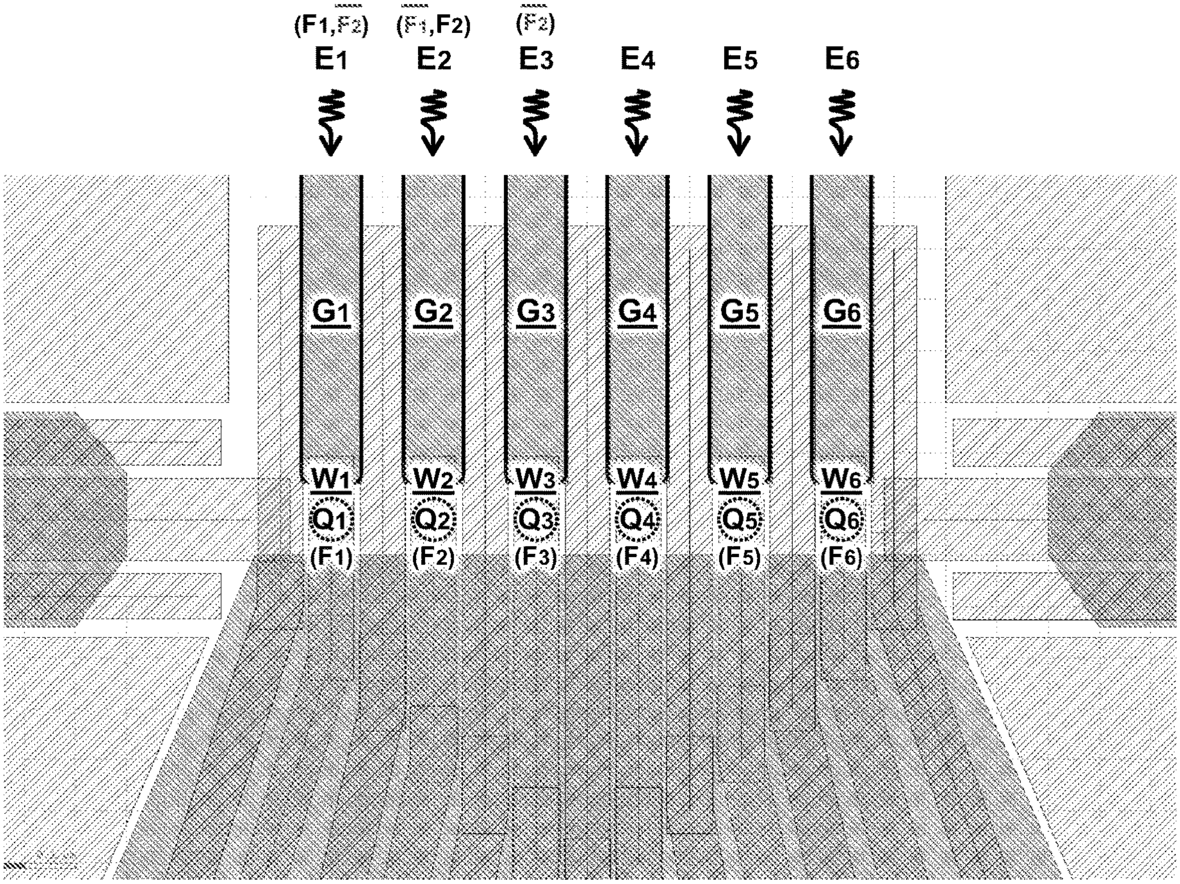
FIG. 1A illustrates part of a quantum processor design.

Terminology used for describing particular embodiments is not intended to be limiting of the invention. As used herein, the singular forms "a", "an" and "the" are intended to include the plural forms as well, unless the context clearly indicates otherwise. The term "and/or" includes any and all combinations of one or more of the associated listed items. It will be understood that the terms "comprises" and/or "comprising" specify the presence of stated features but do not preclude the presence or addition of one or more other features. It will be further understood that when a particular step of a method is referred to as subsequent to another step, it can directly follow said other step or one or more intermediate steps may be carried out before carrying out the particular step, unless specified otherwise. Likewise it will be understood that when a connection between structures or components is described, this connection may be established directly or through intermediate structures or components unless specified otherwise.

The invention is described more fully hereinafter with reference to the accompanying drawings, in which embodiments of the invention are shown. In the drawings, the absolute and relative sizes of systems, components, layers, and regions may be exaggerated for clarity. Embodiments may be described with reference to schematic and/or cross-section illustrations of possibly idealized embodiments and intermediate structures of the invention. In the description and drawings, like numbers refer to like elements throughout. Relative terms as well as derivatives thereof should be construed to refer to the orientation as then described or as shown in the drawing under discussion. These relative terms are for convenience of description and do not require that the system be constructed or operated in a particular orientation unless stated otherwise.

Figure 1B:
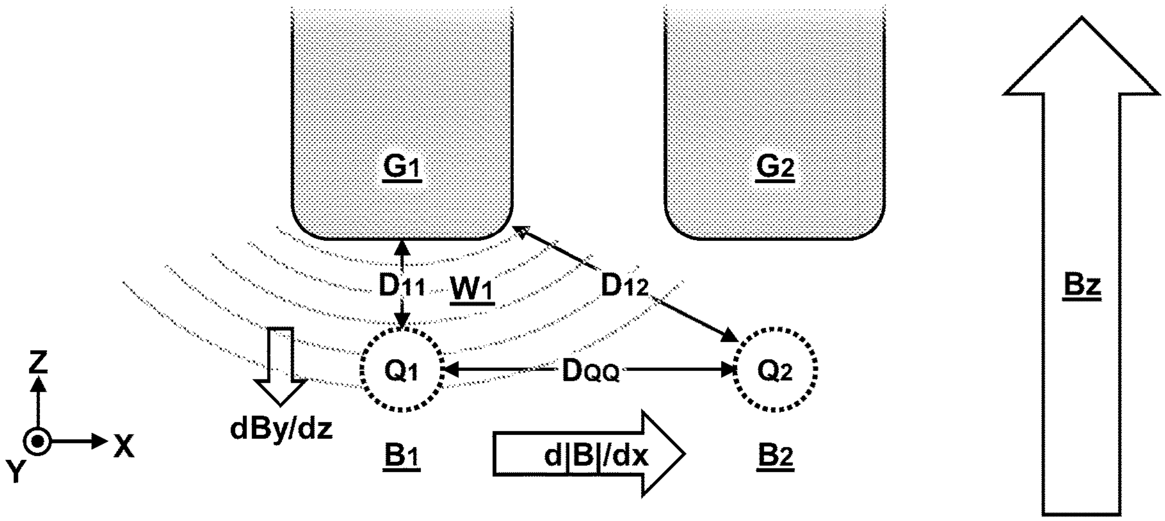
FIG. 1B illustrates a further detail of the design focused on respective qubits.

FIG. 1A illustrates part of a quantum processor design. FIG. 1B illustrates a further detail of the design focused on respective qubits.

Aspects can be embodied as a method or system for driving a set of qubits Q1,Q2. Typically, the set of qubits comprises at least a first qubit Q1 and a second qubit Q2. Also more than two qubits can be provided, e.g. as shown. For example, the system comprises three, four, five, six, or more qubits. In one embodiment, the first qubit Q1 is provided to have a first driving frequency F1, and a second qubit Q2, adjacent the first qubit Q1, is provided to have having a second driving frequency F2, which is substantially different from the first driving frequency F1. Also a third qubits Q3 can be provided adjacent the second qubit Q2 opposite the first qubit Q1, e.g. with still different driving frequency F3, or with the same or similar driving frequency F1 as the first qubit Q1. Preferably, at least adjacent qubits have substantially different driving frequencies. For example, the driving frequencies of adjacent qubits are different by at least 100 kHz, preferably at least 1 MHz, at least 10 MHz, or even more than 100 MHz. The larger the difference in driving frequency, the better can be the individual control/addressability of the respective qubits. On the other hand there can be limitations in the differences of driving frequency, e.g. due to the relative close proximity of the qubits. Typically, the optimal frequency separation of qubits may also depend on how fast they need to be driven to stay well within the coherence time. As an example, for SiGe devices driven with EDSR, a separations on the order of 100-200 MHz can be optimal, although also other frequencies may be used. In donor qubits which can have much higher coherence, the frequency separation can be lower, e.g. between 1-2 MHz. For trapped ions, the frequency separation it can be even less, e.g. around 100 kHz.

In some embodiments, a first microwave gate G1 is configured to apply a first microwave signal W1 to the first qubit Q1. In other or further embodiments, a second microwave gate G2 is configured to apply a second microwave signal W2 to the second qubit Q2. Preferably, the second microwave gate G2 is separate from the first microwave gate G1. In this way each gate can apply a respective signal (predominantly) to a respective qubit. In one embodiment, a first electrical signal E1 is applied to the first microwave gate G1 comprising the first driving frequency F1. In this way the first microwave signal W1 can be applied at the first driving frequency F1 to the first qubit Q1, for driving the first qubit Q1. As described herein, a second electrical signal E2 is applied to the second microwave gate G2 simultaneously with the applying of the first electrical signal E1 to the first microwave gate G1. Preferably, the second electrical signal E2 also comprises the first driving frequency F1 for generating the second microwave signal W2 with the first driving frequency F1. Most preferably, the second electrical signal E2 is tuned such that the second microwave signal W2 arrives in counterphase to the first microwave signal W1 at the second qubit Q2 for at least partially compensating, e.g. substantially cancelling, crosstalk of the first microwave signal W1 to the second qubit Q2.

Typically, the microwave signals are generated at frequencies on the order of GHz. This means that the wavelengths are typically on the order of centimeters, which is much higher than the distance between qubits (less than a micrometer, tens of nanometer). So, for the second microwave signal W2 to arrive in counterphase with the first microwave signal W1 it may be typically sufficient that the second electrical signal E2 is in counterphase with the first electrical signal E1 at least at the position of generating the microwaves, near the qubits (there could be phase differences at the point of generating the electrical signals depending on the respective path lengths to the respective signal generator).

In some embodiments, a respective state of the qubits is determined by a respective spin, e.g. electron spin. For example, the qubits are quantum-dot-based spin qubits. For example, each qubit is defined by the location of a respective quantum dot. These qubits can have substantial advantages over other types of qubits owing to their potential for all-electrical operation and ability to be integrated at high density onto an industrial platform. For example, the (Zeeman-split) spin-up and spin-down states of an electron can be used to represent 0 and 1 states of the qubit. Also other spin systems can be envisaged.

In some embodiments, a respective driving frequency F1,F2 of each qubit Q1,Q2 is determined by a respective energy difference between different spin states of the qubit Q1,Q2. For example, the energy difference between spin-up and spin-down states can be different for different qubits Q1,Q2. Accordingly a respective frequency F1,F2 for driving a respective qubit Q1,Q2 between spin states can be different. In one embodiment, the energy difference is determined by a respective magnetic field B1,B2 experienced by the respective qubit Q1,Q2. Typically, the stronger the magnetic field applied to a quantum spin system, the larger the splitting between energy levels of different spin states, and the higher the driving frequency to switch between these states.

In some embodiments, the qubits are disposed in a first magnetic field gradient d|B|/dx with a total or absolute value of the magnetic field |B| changing as function of a first direction X between the qubits Q1,Q2 such that the total magnetic field B1 experienced by the first qubit Q1 is smaller (or larger) than the total magnetic field B2 experienced by the second qubit Q1 by at least 100 kHz, preferably at least 1 MHz, at least 10 MHz, or even more than 100 MHz. Typically, the total magnetic field determines the driving frequency of the spin system, e.g. by affecting the Larmor precession of the spin.

In some embodiments, the qubits Q1,Q2 are configured to be electrically driven by the respective microwave signals W1,W2 causing displacement of the respective spin system, e.g. electron, in a second direction Z through a second magnetic field gradient dBy/dz. By using an oscillating electric field of microwaves to displace the spin system in a magnetic field gradient, in effect the spin system experiences a changing magnetic field which can drive a transition between the spin states. This is also referred to as electric dipole spin resonance (EDSR). In general, EDSR allows to flip the orientation of the magnetic moments through the use of electromagnetic radiation at resonant frequencies. Alternatively, it can also be envisaged to directly apply an oscillating magnetic field to each qubit, e.g. by means of a respective antenna acting as the microwave gate. However, this may be more difficult to control and typically needs higher currents.

Preferably, the first direction X, between the qubits, is different from the second direction Z, in which direction the qubits are predominantly driven. For example, the second direction Z is transverse or perpendicular to the first direction. In one embodiment, the second magnetic field gradient dBy/dz has a component in a third direction Y that changes as function of displacement in the second direction Z. For example, the third direction Y is perpendicular to both the first direction X and second direction Z. Alternatively, the first and second magnetic field gradients can also be in the same direction, e.g. by driving the spin system along the magnetic field gradient in the first direction X between the qubits Q1,Q2.

In some embodiments, each microwave gate G1,G2 comprises a respective (at least one) electrode adjacent each respective qubit Q1,Q2. Preferably, the electrodes are configured to emit a respective microwave signal W1,W2 transmitted to the respective qubit Q1,Q2. For example, by applying an oscillating voltage and charge to the electrode, a corresponding electric field can be generated driving the respective qubit in a direction away and/or towards the electrode while traversing a magnetic field gradient.

In a preferred embodiment, the first microwave gate G1 is closer to the first qubit Q1 than to the second qubit Q2. Most preferably, the second microwave gate G2 is also closer to the second qubit Q2 than to the first qubit Q1. For example, a first minimum distance D11 between an electrode forming the first microwave gate G1 and the first qubit Q1 is less than a second minimum distance D12 between the electrode and the second qubit Q2 by at least 30% (factor 1.3), preferably at least a factor two or at least a factor three, more preferably at least a factor five, most preferably at least a factor ten. The larger the distance of the second qubit Q2 to the electrode forming the first microwave gate G1, the smaller may be a relative intensity of the first microwave signal W1 experienced by the second qubit Q2 which is not the intended recipient of that signal. On the other hand, the distance cannot be too large because the qubits Q1,Q2 themselves may be relatively close together, e.g. to allow interaction there between. For example, the first minimum distance D11 is less than one micrometer, preferably, less than half a micrometer, more preferably less than hundred nanometer, most preferably less than fifty nanometer. For example, the second minimum distance D12 is more than fifty nanometer, preferably more than hundred nanometer, e.g. up to a micrometer, or more. In one embodiment, a distance between the first qubit Q1 and adjacent second qubit Q2 is less than one micrometer, preferably less than half a micrometer, more preferably less than two hundred nanometer, most preferably between ten nanometer and hundred nanometer. Typically, there can also be difference in angle at which the microwave arrives, which may give an extra difference in crosstalk.

Figure 2A:
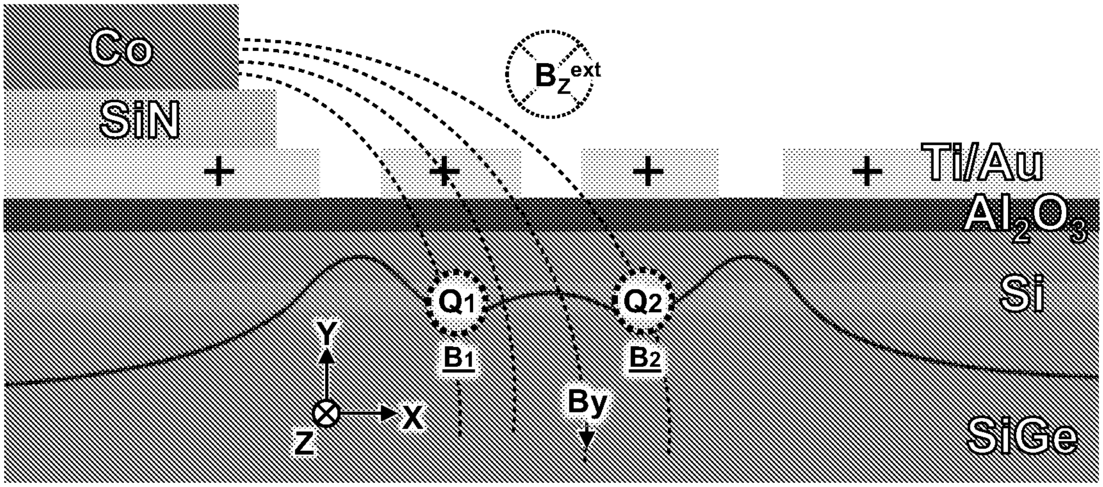
FIG. 2A illustrates a cross-section view of a two-qubit quantum processor.

FIG. 2A illustrates a cross-section view of a two-qubit quantum processor. In some embodiments, the qubits are formed in a semiconductor substrate. For example, the qubits are formed electrostatically in a Si quantum well, with SiGe buffer and spacer layers, and $Al_2O_3$ and SiN dielectrics separating the substrate from the Ti/Au gates and Co micromagnets. Of course also other materials and architecture can be used. In one embodiment, an external (main) magnetic field $B_Z^{ext}$ is applied to the qubits by an external magnet, e.g. electromagnet. For example, this external field may determine a component of the total magnetic field experienced by the qubits. In another or further embodiment, a magnetic field gradient is applied to the qubits Q1,Q2 using a (permanent) micromagnet disposed in vicinity of the qubits. For example, the micromagnet may determine a gradient of the magnetic field by its relative positioning with respect to the different qubits. The magnetic fields and gradients as described herein can also be using only an external magnet or only a micromagnet. For example, the external magnetic field may already have sufficient gradient so the micromagnet can be omitted, or the micromagnet may already be sufficiently strong that the external magnetic field can be omitted.

Figure 2B:
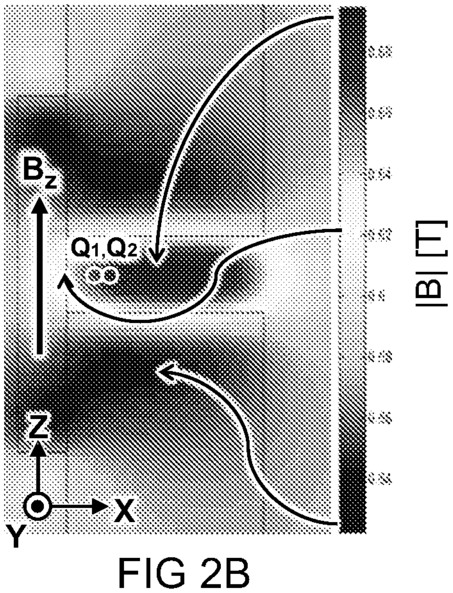
FIG. 2B illustrates a grayscale map of (total) magnetic field strength in a plan view of a quantum processor with a set of qubits.

FIG. 2B illustrates a grayscale map of (total) magnetic field strength |B| in a plan view X,Z of a quantum processor with a set of qubits Q1,Q2. Also shown is a main direction Z of the magnetic field Bz.

Figure 2C:
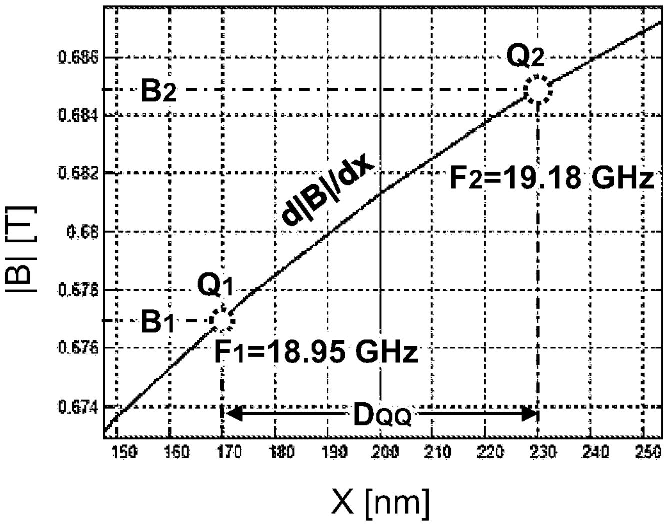
FIG. 2C illustrates a graph of the magnetic field strength as function of location of different qubits.

FIG. 2C illustrates a graph of the magnetic field strength |B| as function of location X of different qubits Q1,Q2. As shown, the first magnetic field gradient d|B|/dx may cause the different qubits Q1,Q2 to have different driving frequencies F1,F2. In this case the qubits Q1,Q2 are at a distance of 60 nm from each other resulting in different driving frequency F1=18.95 GHz, F2=19.18 GHz.

Figure 2D:
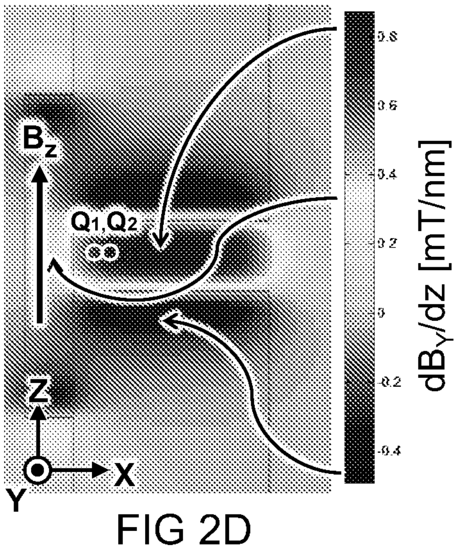
FIG. 2D illustrates a grayscale map of a second magnetic field gradient in a plan view of a quantum processor with a set of qubits.

FIG. 2D illustrates a grayscale map of a second magnetic field gradient dBy/dz in a plan view X,Z of a quantum processor with a set of qubits Q1,Q2. In this case, the second magnetic field gradient dBy/dz is the gradient of the Y component of the magnetic field as a function of a change in position Z.

Figure 2E:
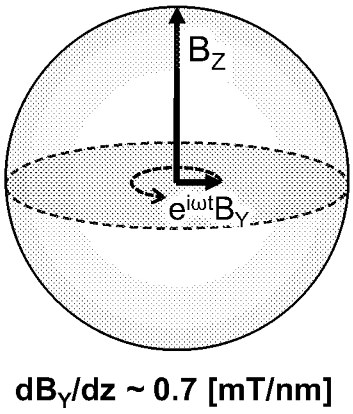
FIG. 2E illustrates a Bloch sphere.

FIG. 2E illustrates a Bloch sphere. For example, this picture illustrates a spin system precessing about a main magnetic field vector Bz, and a periodic variation of a perpendicular magnetic field "$B_Y$" at a frequency "ω" which can be induced by microwaves displacing the spin system along a direction "Z" in the second magnetic field gradient dBy/dz. In this case the gradient is calculated to be about 0.7 mT/nm.

Figure 3A:
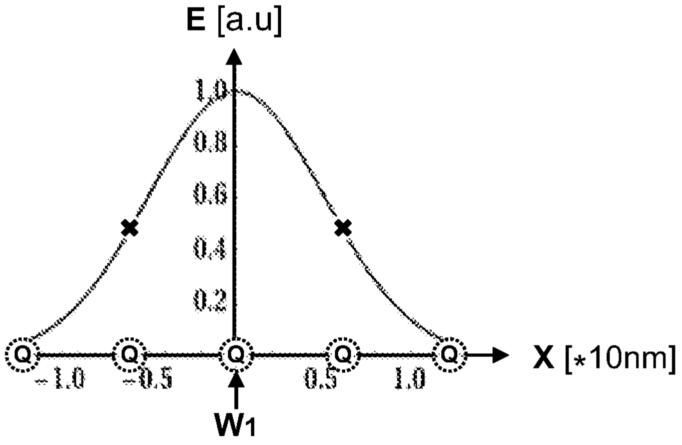
FIGS. 3A-3C illustrates graph of simulated microwave electric field at positions of different qubits.
Figure 3B:
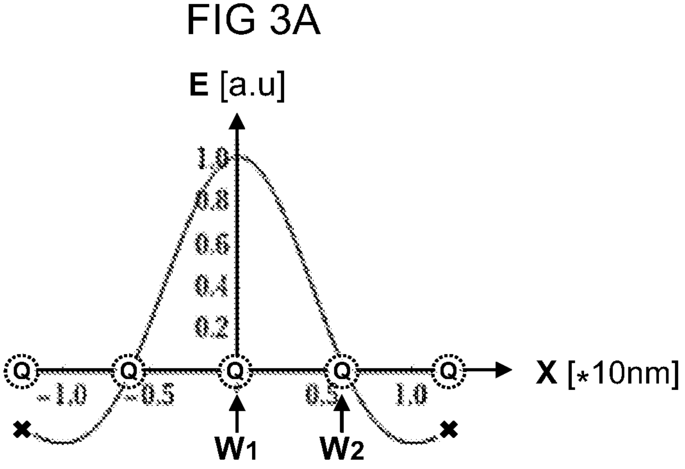
Figure 3C:
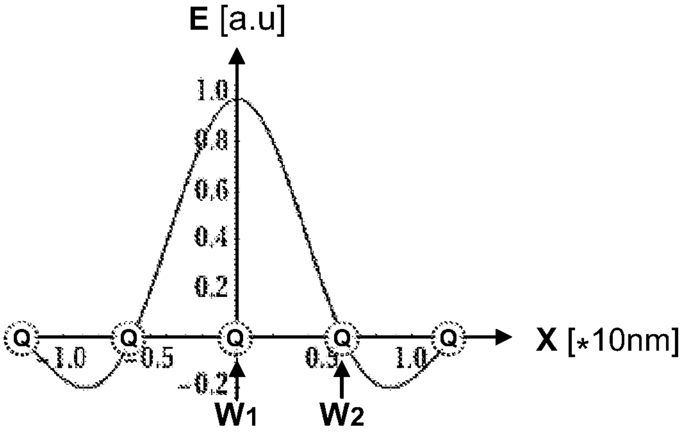

FIGS. 3A-3C illustrates graphs of simulated microwave electric field "E" at positions "X" of different qubits "Q";

FIG. 3A illustrates a case wherein a first microwave signal W1 is applied to a central first qubit. As shown this may cause crosstalk of an electric field at neighboring adjacent qubits.

FIG. 3B illustrates a preferred embodiment wherein a second microwave signal W2 is generated and applied to a neighboring second qubit for at least partially compensating crosstalk of the first microwave signal W1. Typically, an amplitude of the first microwave signal W1 is lower at the second qubit Q2 than at the first qubit Q1 due to the greater distance. So to compensate, the second microwave signal W2 can applied with a corresponding lower intensity or amplitude compared to the first microwave signal W1. For example, the second electrical signal E2 for applying the second microwave signal W2 at the first driving frequency F1 to the second qubit Q2 has a lower amplitude than the first electrical signal E1 for applying the first microwave signal W1 at the first driving frequency F1 to the first qubit Q1, e.g. lower by at least ten percent, preferably at least twenty percent, more preferably at least thirty percent. For example, an amplitude of the AC voltage corresponding to the second electrical signal E2 is between a factor 0.1-0.8 times that of the first electrical signal E1.

FIG. 3C illustrates another or further preferred embodiment. As shown in the preceding figure, the compensating signal W2 may cause further crosstalk to the next nearest neighbor. In one embodiment, e.g. as shown in this figure, the set of qubits comprises a third qubit Q3 adjacent the second qubit Q2. For example, the second qubit Q2 is located between the first qubit Q1 and the third qubit Q3. In some embodiments, a third microwave signal W3 is applied via a third microwave gate G3 to the third qubit Q3 at the first driving frequency F1, simultaneously with applying the first and second microwave signals W1,W2 at the first driving frequency F1 to the first qubit Q1 and second qubit Q2, respectively, for at least partially compensating, e.g. substantially cancelling, crosstalk of the first microwave signal W1 and/or second microwave signal W2 on the third qubit Q3. For example, the third electrical signal E3 comprises the first driving frequency F1 substantially in counterphase to the second electrical signal E2 (and/or in phase with the first electrical signal E1) for generating the third microwave signal W3 with the first driving frequency F1 in counterphase to the (adjacent generated) second microwave signal W2. Typically, the third electrical signal E3 may comprise a component with the first driving frequency F1 at relatively low amplitude, e.g. even lower than in the second electrical signal E2, corresponding to further attenuation of the first microwave signal W1 before it arrives at the third qubit Q3 (at relatively larger distance). For example, the signal that needs to be cancelled out at the third qubit is coming from the cancellation of second qubit.

Figure 4:
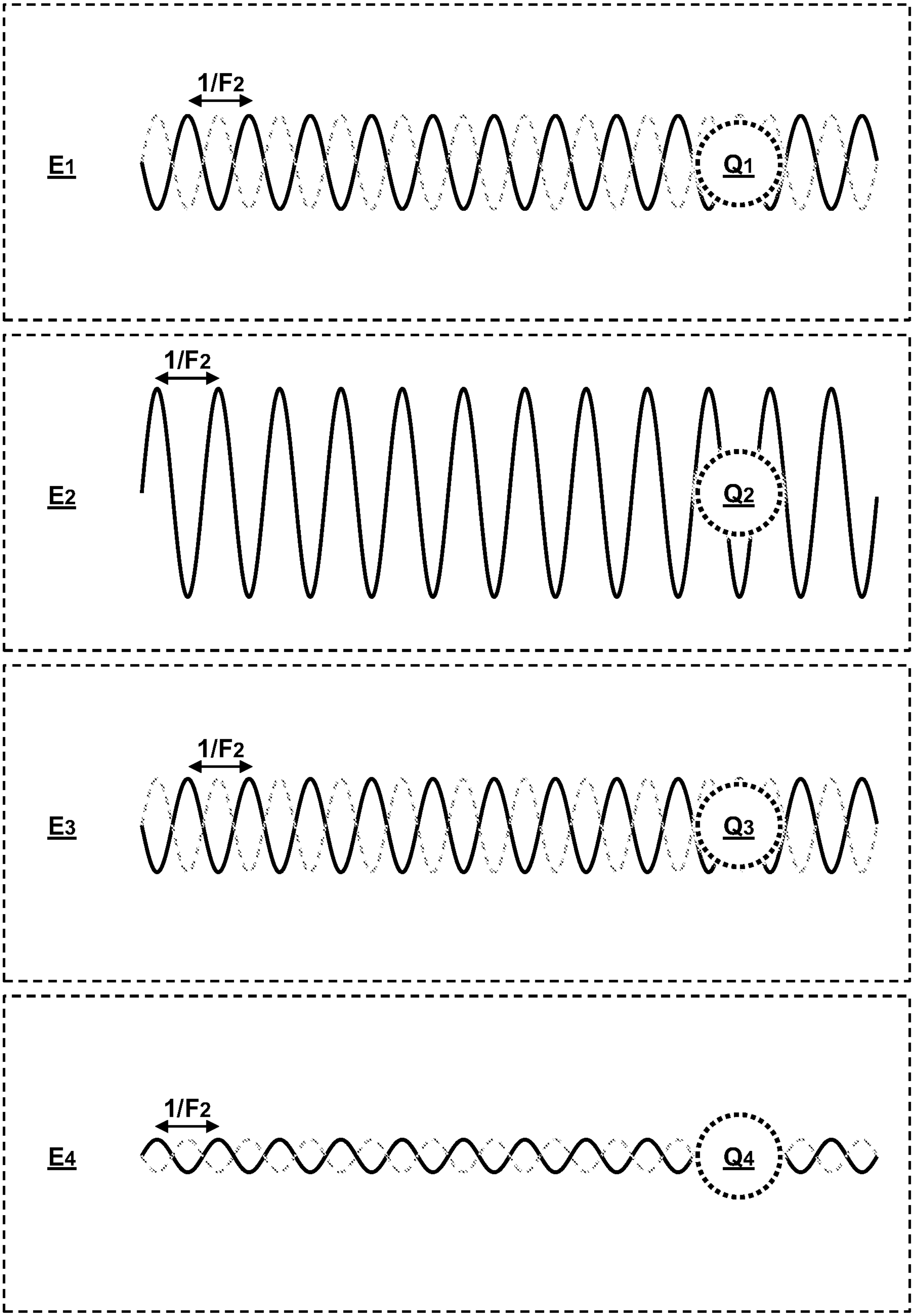
FIG. 4 illustrates an example of respective electric signals for generating microwaves at respective qubits.

FIG. 4 illustrates an example of respective electric signals for generating microwaves at respective qubits. For example, these may correspond to the electric signal E1, E2, E3, E4 applied to respective qubits Q1, Q2, Q3, Q4 as shown in FIG. 1. In this case an electric signal E2 is generated with a driving frequency F2 to drive the respective qubit Q2. At the same time electric signals E1,E3 are generated with the same driving frequency F2 (but lower amplitude) at the respective locations of neighboring qubits Q1,Q3 to compensate crosstalk (illustrated by gray dashed line). Furthermore, an electric signal E4 can be generated at the next nearest neighbor at still lower amplitude.

Figure 5:
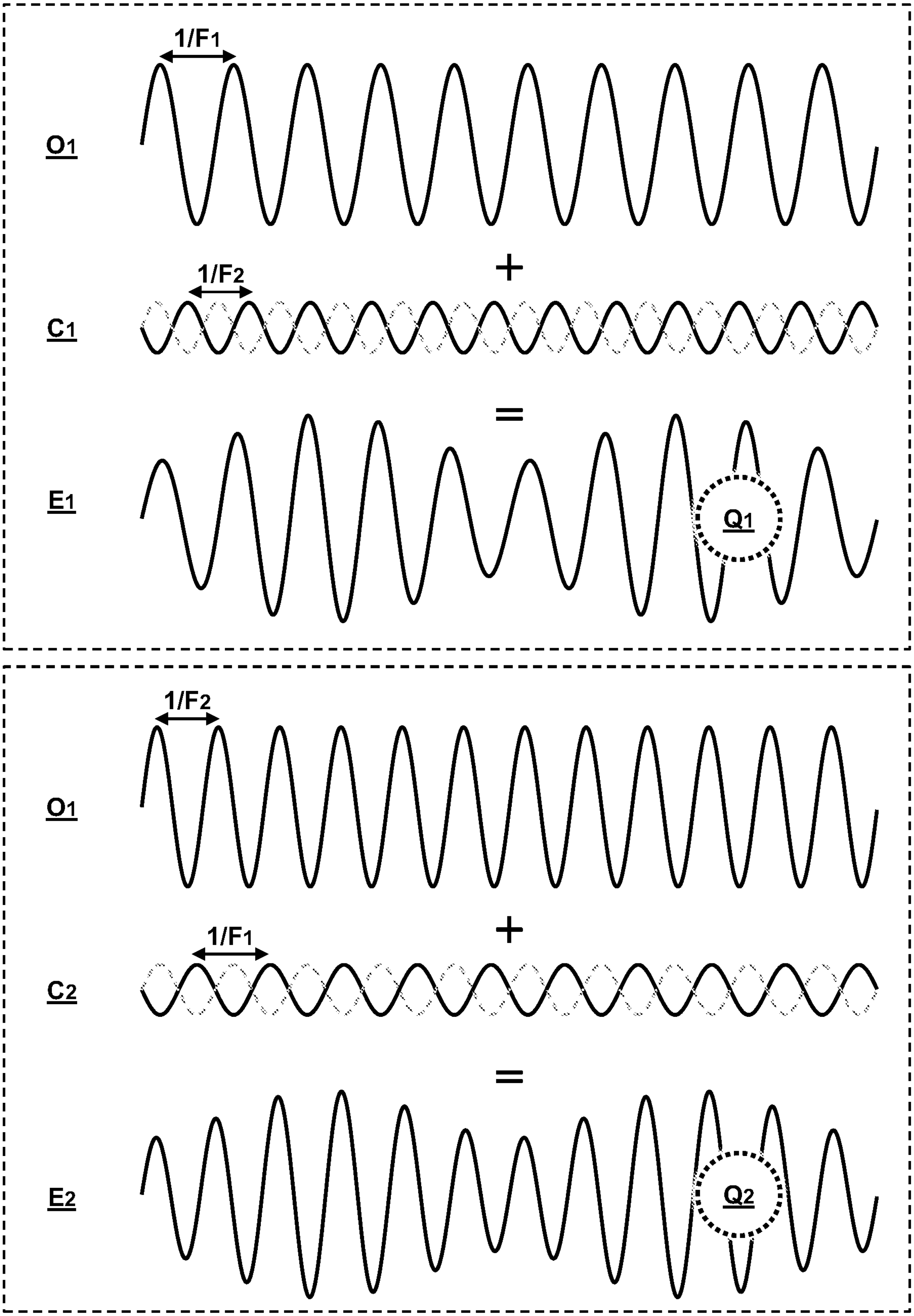
FIG. 5 illustrates another example electric signals for generating microwaves at respective qubits.

FIG. 5 illustrates another example of electric signals for generating microwaves at respective qubits. In this case it is actually intended to drive both qubits Q1 and Q2 with a respective signals having respective driving frequency F1,F2. However, these may cause mutual crosstalk at the neighboring qubit. In one embodiment, the second electrical signal E2 comprises the second driving frequency F2 for driving the second qubit Q2 and the first driving frequency F1 shifted in phase, e.g. in counterphase, and/or lowered in amplitude with respect to first driving frequency F1 in the first microwave signal W1 for at least partially compensating, e.g. substantially cancelling, crosstalk of the first microwave signal W1 to the second qubit Q2. In one embodiment, the first electrical signal E1 comprises the first driving frequency F1 for driving the first qubit Q1 and the second driving frequency F2 shifted in phase, e.g. in counterphase, and/or lowered in amplitude with respect to the second driving frequency F2 in the second microwave signal W2 for at least partially compensating, e.g. substantially cancelling, crosstalk of the second microwave signal W2 to the first qubit Q1.

In interpreting the appended claims, it should be understood that the word "comprising" does not exclude the presence of other elements or acts than those listed in a given claim; the word "a" or "an" preceding an element does not exclude the presence of a plurality of such elements; any reference signs in the claims do not limit their scope; several "means" may be represented by the same or different item(s) or implemented structure or function; any of the disclosed devices or portions thereof may be combined together or separated into further portions unless specifically stated otherwise.

The invention claimed is:

1. A method for driving a set of qubits, the method comprising:

providing a first qubit having a first driving frequency and a first microwave gate configured to apply a first microwave signal to the first qubit;

providing a second qubit, adjacent the first qubit, having a second driving frequency, different from the first driving frequency, and a second microwave gate, separate from the first microwave gate, configured to apply a second microwave signal to the second qubit, wherein a respective driving frequency of each qubit is determined by a respective energy difference between different spin states of the qubit, and wherein the energy difference is determined by a respective magnetic field experienced by the respective qubit;

applying a first electrical signal comprising the first driving frequency to the first microwave gate for applying the first microwave signal at the first driving frequency to the first qubit, for driving the first qubit; and simultaneously applying a second electrical signal to the second microwave gate, wherein the second electrical signal comprises the first driving frequency shifted in phase with respect to the first electrical signal for generating the second microwave signal with the first driving frequency arriving at the second qubit in counterphase to first microwave signal for at least partially compensating crosstalk of the first microwave signal to the second qubit.

2. The method according to claim 1, wherein the second electrical signal comprises:

the first driving frequency in counterphase to the first driving frequency in the first microwave signal for at least partially compensating crosstalk of the first microwave signal to the second qubit, and the second driving frequency for driving the second qubit by the second microwave signal simultaneously with the driving of the first qubit by the first microwave signal.

3. The method according to claim 2, wherein the first electrical signal comprises:

the first driving frequency for driving the first qubit, and the second driving frequency in counterphase to the second driving frequency of the second microwave signal for at least partially compensating crosstalk of the second microwave signal to the first qubit.

4. The method according to claim 1, wherein each microwave gate comprises a respective electrode disposed adjacent a respective qubit and configured to emit a respective microwave signal transmitted to the respective qubit, wherein an end of the respective electrode forming the first microwave gate is closer to the first qubit than to the second qubit, wherein an end of the respective electrode forming the second microwave gate is closer to the second qubit than to the first qubit, wherein the first electrical signal comprises the first driving frequency at a first amplitude, and wherein the second electrical signal comprises the first driving frequency at a second amplitude that is lower than the first amplitude.

5. The method according to claim 1, wherein the set of qubits comprises a third qubit, and wherein a third microwave signal is applied via a, separate, third microwave gate to the third qubit at the first driving frequency, simultaneously with applying the first microwave signal and the second microwave signal at the first driving frequency to the first qubit and second qubit, respectively, for at least partially compensating crosstalk of the first driving frequency in the second microwave signal on the third qubit.

6. The method according to claim 1, wherein a frequency difference between the first driving frequency and the second driving frequency is at least 100 kHz.

7. The method according to claim 1, wherein the first qubit and the second qubit are disposed in a first magnetic field gradient with a total magnetic field changing as function of a first direction between the first qubit and the second qubit such that the total magnetic field experienced by the first qubit is different from the total magnetic field experienced by the second qubit.

8. The method according to claim 7, wherein the first qubit and the second qubit are configured to be electrically driven by the respective microwave signals causing displacement of the respective spin system in a second direction through a second magnetic field gradient, wherein the first direction is perpendicular to the second direction.

9. The method according to claim 1, wherein each microwave gate, of the first microwave gate and the second microwave gate, comprises a respective electrode disposed adjacent a respective one of the first qubit and the second qubit, and wherein each respective electrode is configured to emit a respective microwave signal transmitted to the respective qubit.

10. The method according to claim 9, wherein an end of the respective electrode forming the first microwave gate is closer to the first qubit than to the second qubit by at least 30%, and wherein an end of the respective electrode forming the second microwave gate is closer to the second qubit than to the first qubit by at least 30%.

11. The method according to claim 1, wherein a first minimum distance between an electrode forming the first microwave gate and the first qubit is less than a hundred nanometer, and wherein a second minimum distance between the electrode and the second qubit is greater than a hundred nanometer.

12. The method according to claim 1, wherein a distance between the first qubit and the second qubit, which is adjacent to the first qubit, is between ten nanometer and a hundred nanometer.

13. The method according to claim 1, wherein the first qubit and the second qubit are quantum-dot-based spin qubits.

14. The method according to claim 1, wherein an external magnetic field is applied to the first qubit and the second qubit by an external electromagnet, and wherein a magnetic field gradient is applied to the first qubit and the second qubit using a micromagnet disposed in a vicinity of the first qubit and the second qubit.

15. A quantum processor comprising:

a first qubit having a first driving frequency and a first microwave gate configured to apply a first microwave signal to the first qubit;

a second qubit, adjacent the first qubit, having a second driving frequency, different from the first driving frequency, and a second microwave gate, separate from the first microwave gate, that is configured to apply a second microwave signal to the second qubit, wherein a respective driving frequency of each qubit is determined by a respective energy difference between different spin states of the qubit, and wherein the respective energy difference is determined by a respective magnetic field experienced by each one of the first qubit and the second qubit, respectively; and a controller configured to:

apply a first electrical signal comprising the first driving frequency to the first microwave gate for applying the first microwave signal at the first driving frequency to the first qubit, for driving the first qubit; and simultaneously apply a second electrical signal to the second microwave gate, wherein the second electrical signal comprises the first driving frequency shifted in phase with respect to the first electrical signal for generating the second microwave signal with the first driving frequency arriving at the second qubit in counterphase to the first microwave signal for at least partially compensating crosstalk of the first microwave signal to the second qubit.

16. The quantum processor according to claim 15, wherein each microwave gate comprises a respective electrode disposed adjacent a respective qubit and configured to emit a respective microwave signal transmitted to the respective qubit, wherein an end of the respective electrode forming the first microwave gate is closer to the first qubit than to the second qubit, wherein an end of the respective electrode forming the second microwave gate is closer to the second qubit than to the first qubit, and wherein the controller is configured to apply the first electrical signal comprising the first driving frequency at a first amplitude and the second electrical signal comprising the first driving frequency at a second amplitude that is lower than the first amplitude.

17. The quantum processor according to claim 15, comprising a third qubit and a separate, third microwave gate, wherein the controller is configured to apply a third microwave signal via the third microwave gate to the third qubit at the first driving frequency, simultaneously with applying the first microwave signal and the second microwave signal at the first driving frequency to the first qubit and the second qubit, respectively, for at least partially compensating crosstalk of the first driving frequency in the second microwave signal on the third qubit.

18. The quantum processor according to claim 15, wherein each microwave gate comprises a respective electrode disposed adjacent a respective qubit and configured to emit a respective microwave signal transmitted to the respective qubit, wherein an end of the respective electrode forming the first microwave gate is closer to the first qubit than to the second qubit by at least 30%, and wherein an end of the respective electrode forming the second microwave gate is closer to the second qubit than to the first qubit by at least 30%.

19. The quantum processor according to claim 15, wherein a first minimum distance between an electrode forming the first microwave gate and the first qubit is less than a hundred nanometer, wherein a second minimum distance between the electrode and the second qubit is greater than a hundred nanometer, and wherein a distance between the first qubit and the second qubit, which is adjacent to the first qubit, is between ten nanometer and a hundred nanometer.

20. The quantum processor according to claim 15, comprising an external electromagnet configured to apply an external magnetic field to the qubits, and a micromagnet that is disposed in a vicinity of the first qubit and the second qubit and that is configured to apply a magnetic field gradient to the first qubit and the second qubit, wherein the first qubit and the second qubit are disposed in a first magnetic field gradient with a total magnetic field changing as function of a first direction between the first qubit and the second qubit such that the total magnetic field experienced by the first qubit is different from the total magnetic field experienced by the second qubit.

* * * * *